US012795771B2

(12) United States Patent
Zhang

(10) Patent No.: US 12,795,771 B2
(45) Date of Patent: Nov. 10, 2026

(54) MESSAGE SENDING METHOD, DEVICE, AND STORAGE MEDIUM

(71) Applicant: HUAWEI TECHNOLOGIES CO., LTD., Shenzhen (CN)

(72) Inventor: Wenjun Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 772 days.

(21) Appl. No.: 18/160,151

(22) Filed: Jan. 26, 2023

(65) Prior Publication Data

US 2023/0180341 A1 Jun. 8, 2023

Related U.S. Application Data

(63) Continuation of application No. PCT/CN2021/098128, filed on Jun. 3, 2021.

(30) Foreign Application Priority Data

Jul. 30, 2020 (CN) ......................... 202010752058.7

(51) Int. Cl.
*H04W 76/27* (2018.01)
*H04W 76/12* (2018.01)

(52) U.S. Cl.
CPC ........... *H04W 76/27* (2018.02); *H04W 76/12* (2018.02)

(58) Field of Classification Search
CPC ...... H04W 76/27; H04W 76/12; H04W 36/06
See application file for complete search history.

(56) References Cited

U.S. PATENT DOCUMENTS 9,936,534 B2 * 4/2018 Liu ..................... H04L 12/1407
2012/0093106 A1 4/2012 Dong
(Continued)

FOREIGN PATENT DOCUMENTS

CN 105897386 A 8/2016
CN 108632934 A 10/2018
(Continued)

OTHER PUBLICATIONS

"3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 16)," 3GPP TS 36.523-1 V16.5.0, pp. 1-6768, 3rd Generation Partnership Project, Valbonne, France (Jun. 2020).
(Continued)

*Primary Examiner* — Justin T Van Roie
(74) *Attorney, Agent, or Firm* — Leydig, Voit & Mayer, Ltd.

(57) ABSTRACT

A network device sends first radio resource control (RRC) reconfiguration signaling to a terminal device, where the first RRC reconfiguration signaling carries a first configuration, and the first RRC reconfiguration signaling indicates the terminal device to make the first configuration effective or make the first configuration ineffective. The network device receives first RRC reconfiguration complete signaling sent by the terminal device, where the first RRC reconfiguration complete signaling indicates that the first configuration has been effective or the first configuration has been ineffective.

10 Claims, 9 Drawing Sheets

(56) References Cited

U.S. PATENT DOCUMENTS

| | | | |
|---|---|---|---|
| 2014/0334355 A1 | 11/2014 | Ekpenyong et al. | |
| 2016/0323873 A1 | 11/2016 | Takeda et al. | |
| 2016/0337023 A1 | 11/2016 | Yi et al. | |
| 2017/0331611 A1 | 11/2017 | Stern-Berkowitz et al. | |
| 2022/0210743 A1* | 6/2022 | Yi | H04W 52/146 |
| 2023/0068134 A1* | 3/2023 | Teyeb | H04W 76/30 |

FOREIGN PATENT DOCUMENTS

| | | |
|---|---|---|
| CN | 109246848 A | 1/2019 |
| CN | 109951878 A | 6/2019 |
| CN | 110086585 A | 8/2019 |
| CN | 110637497 A | 12/2019 |

OTHER PUBLICATIONS

"Description of EN-DC procedures," 3GPP TSG-RAN WG3 Meeting #96, R3-171469, Hangzhou, P.R. China, Total 14 pages, 3rd Generation Partnership Project, Valbonne, France (May 15-17, 2017).

* cited by examiner

MESSAGE SENDING METHOD, DEVICE, AND STORAGE MEDIUM

CROSS-REFERENCE TO RELATED APPLICATIONS

This application is a continuation of International Application No. PCT/CN2021/098128, filed on Jun. 3, 2021, which claims priority to Chinese Patent Application No. 202010752058.7, filed on Jul. 30, 2020. The disclosures of the aforementioned applications are hereby incorporated by reference in their entireties.

FIELD

Embodiments of this application relate to the field of communication technologies, and further, to a message sending method, a device, and a storage medium.

BACKGROUND

Regardless of whether in a long term evolution (LTE) system or a fifth generation mobile network (5G), once radio resource control (RRC) reconfiguration occurs when some parameters or configurations in RRC reconfiguration signaling change, and for example, a time division multiplexing (TDM) configuration needs to be adjusted due to a delay in transmission and information parsing, a network device cannot know when a terminal device learns of a changed TDM configuration. Therefore, there is a TDM configuration ambiguity period. Duration of the TDM configuration ambiguity period is after the network device delivers RRC reconfiguration information and before the network device receives RRC reconfiguration complete signaling sent by the terminal device.

Currently, the TDM configuration may cause a change of a scheduling request (SR) configuration, a channel quality indicator (CQI) configuration, a sounding reference signal (SRS) configuration, a discontinuous reception (DRX) configuration, or the like. Therefore, in a conventional technical solution, the network device delivers both the TDM configuration and the SR configuration, the CQI configuration, the SRS configuration, the DRX configuration, or the like to the terminal device in a same piece of RRC reconfiguration signaling. In this way, after receiving the RRC reconfiguration signaling, the terminal device synchronously makes the TDM configuration and the SR configuration, the CQI configuration, the SRS configuration, or the DRX configuration effective, and then the terminal device feeds back RRC reconfiguration complete signaling to the network device. However, due to existence of the TDM configuration ambiguity period, the network device in the duration cannot know when the terminal device feeds back the RRC reconfiguration complete signaling, and the network device cannot know when the terminal device learns of the changed TDM configuration. Consequently, a time sequence and a configuration on a network device side in the duration cannot be aligned with a time sequence and a configuration on a terminal device side, and a bit error and a call drop occur. In addition, before and after the TDM configuration is effective, the SR configuration, the CQI configuration, the SRS configuration, the DRX configuration, or the like changes to a great extent. Therefore, in the TDM configuration ambiguity period, a quantity of bits used when the terminal device feeds back downlink response signaling to the network device cannot be determined for the network device. In addition, when the downlink response signaling is associated with a physical uplink shared channel (PUSCH), the network device may fail to correctly demodulate uplink data, and the call drop occurs. Alternatively, uplink data may fail to be scheduled due to incorrect SR detection. Alternatively, a downlink index selection problem may be caused due to unreliable CQI reporting value. Alternatively, a timing advance (TA) measurement value may be incorrectly adjusted due to unreliable SRS measurement. Alternatively, an uplink scheduling failure may be caused due to non-aligned DRX configurations, and so on. These problems may cause the bit error and the call drop to a great extent in the TDM configuration ambiguity period.

Therefore, how to effectively and reliably avoid the bit error and the call drop that are caused because the time sequences and the configurations on the network device side and the terminal device side cannot be aligned in the TDM configuration ambiguity period is a problem that urgently needs to be resolved.

SUMMARY

Embodiments of this application provide a message sending method, a device, and a storage medium, so that it is ensured that both time sequences and configurations on a network device side and a terminal device side can be aligned in a TDM configuration ambiguity period, to reduce a bit error rate and a call drop rate.

According to a first aspect, an embodiment of this application provides a message sending method. The method may include:

A network device sends first RRC reconfiguration signaling to a terminal device, where the first RRC reconfiguration signaling carries a first configuration, and the first RRC reconfiguration signaling indicates the terminal device to make the first configuration effective or make the first configuration ineffective.

The network device receives first RRC reconfiguration complete signaling sent by the terminal device, where the first RRC reconfiguration complete signaling indicates that the first configuration has been effective or the first configuration has been ineffective.

Optionally, with reference to the first aspect, in a first possible implementation, the first RRC reconfiguration signaling further carries a second configuration and a handover configuration, the handover configuration indicates the terminal device to hand over a first user instance to a second user instance in a first cell, and the network device covers the first cell.

Correspondingly, that the network device receives first RRC reconfiguration complete signaling sent by the terminal device, where the first RRC reconfiguration complete signaling indicates that the first configuration has been effective or the first configuration has been ineffective includes:

The network device receives the first RRC reconfiguration complete signaling on the second user instance, where the first RRC reconfiguration complete signaling indicates that the first configuration and the second configuration have been effective on the second user instance or the first configuration and the second configuration have been ineffective on the second user instance.

Optionally, with reference to the foregoing first aspect, in a second possible implementation, when the first RRC reconfiguration signaling indicates the terminal device to make the first configuration effective, before the network device sends the first RRC reconfiguration signaling to the terminal device, the method further includes:

The network device sends second RRC reconfiguration signaling to the terminal device, where the second RRC reconfiguration signaling carries a second configuration, and the second RRC reconfiguration signaling indicates the terminal device to modify the second configuration and make a modified second configuration effective.

The network device receives second RRC reconfiguration complete signaling sent by the terminal device.

Optionally, with reference to the first aspect, in a third possible implementation, when the first RRC reconfiguration signaling indicates the terminal device to make the first configuration ineffective, after the network device receives the first RRC reconfiguration complete signaling sent by the terminal device, the method further includes:

The network device sends third RRC reconfiguration signaling to the terminal device, where the third RRC reconfiguration signaling carries a second configuration, and the third RRC reconfiguration signaling indicates the terminal device to modify the second configuration and make a modified second configuration effective.

The network device receives third RRC reconfiguration complete signaling sent by the terminal device.

According to a second aspect, an embodiment of this application provides a message sending method. The method may include:

A terminal device receives first RRC reconfiguration signaling sent by a network device, where the first RRC reconfiguration signaling carries a first configuration.

The terminal device makes the first configuration effective or makes the first configuration ineffective based on the first RRC reconfiguration signaling.

The terminal device sends first RRC reconfiguration complete signaling to the network device, where the first RRC reconfiguration complete signaling indicates that the first configuration has been effective or the first configuration has been ineffective.

Optionally, with reference to the second aspect, in a first possible implementation, the first RRC reconfiguration signaling further carries a second configuration and a handover configuration, and the method further includes:

The terminal device hands over a first user instance to a second user instance in a first cell based on the handover configuration.

Correspondingly, that the terminal device makes the first configuration effective or makes the first configuration ineffective based on the first RRC reconfiguration signaling includes:

The terminal device makes the first configuration effective or makes the first configuration ineffective, and makes the second configuration effective or makes the second configuration ineffective on the second user instance.

Correspondingly, that the terminal device sends first RRC reconfiguration complete signaling to the network device, where the first RRC reconfiguration complete signaling indicates that the first configuration has been effective or the first configuration has been ineffective includes:

The terminal device sends the first RRC reconfiguration complete signaling to the network device on the second user instance, where the first RRC reconfiguration complete signaling indicates that the first configuration and the second configuration have been effective on the second user instance or the first configuration and the second configuration have been ineffective on the second user instance.

Optionally, with reference to the second aspect, in a second possible implementation, before the terminal device makes the first configuration effective based on the first RRC reconfiguration signaling, the method further includes:

The terminal device receives second RRC reconfiguration signaling sent by the network device, where the second RRC reconfiguration signaling carries a second configuration.

The terminal device modifies the second configuration based on the second RRC reconfiguration signaling, and makes a modified second configuration effective.

The terminal device sends second RRC reconfiguration complete signaling to the network device.

Optionally, with reference to the second aspect, in a third possible implementation, after the terminal device sends the first RRC reconfiguration complete signaling to the network device, and when the first RRC reconfiguration complete signaling indicates that the first configuration has been ineffective, the method further includes:

The terminal device receives third RRC reconfiguration signaling sent by the network device, where the third RRC reconfiguration signaling carries a second configuration.

The terminal device modifies the second configuration based on the third RRC reconfiguration signaling, and makes a modified second configuration effective.

The terminal device sends third RRC reconfiguration complete signaling to the network device.

According to a third aspect, an embodiment of this application provides a message sending method. The method may include:

A network device obtains an SR configuration in a TDM configuration ambiguity period.

The network device sends a first scheduling instruction to a terminal device when the SR configuration changes, where the first scheduling signaling indicates the terminal device to send uplink data.

Optionally, with reference to the third aspect, in a first possible implementation, sending the first scheduling instruction to the terminal device includes:

The network device sends the first scheduling signaling to the terminal device based on a preset period.

Optionally, with reference to the third aspect, in a second possible implementation, before the first scheduling instruction is sent to the terminal device, the method further includes:

The network device detects an SR on a first PUCCH, and detects an SR on a second PUCCH, where the first PUCCH is a channel pointed to before the SR configuration changes, and the second PUCCH is a channel pointed to after the SR configuration changes.

Correspondingly, sending the first scheduling instruction to the terminal device includes:

sending the first scheduling instruction to the terminal device when the network device detects the SR on the first PUCCH or detects the SR on the second PUCCH.

According to a fourth aspect, an embodiment of this application provides a message sending method. The method may include:

A terminal device receives a first scheduling instruction sent by a network device when an SR configuration changes, where the SR configuration is obtained by the network device in a TDM configuration ambiguity period.

The terminal device sends uplink data based on the first scheduling instruction.

According to a fifth aspect, an embodiment of this application provides a message sending method. The method may include:

A network device obtains a TDM configuration in a TDM configuration ambiguity period.

The network device calculates a first air interface moment and a second air interface moment based on the TDM configuration, where the first air interface moment is a moment at which a terminal device feeds back downlink response signaling in a first scheduling period, the second air interface moment is a moment at which the terminal device sends uplink data in the first scheduling period, and the first air interface moment does not overlap the second air interface moment.

The network device receives, at the first air interface moment, the downlink response signaling sent by the terminal device, or receives, at the second air interface moment, the uplink data sent by the terminal device.

According to a sixth aspect, an embodiment of this application provides a message sending method. The method may include:

A terminal device sends downlink response signaling to a network device at a first air interface moment, or sends uplink data to the network device at a second air interface moment, where the first air interface moment does not overlap the second air interface moment, the first air interface moment is a moment at which the terminal device feeds back the downlink response signaling in a first scheduling period, and the second air interface moment is a moment at which the terminal device sends the uplink data in the first scheduling period.

According to a seventh aspect, an embodiment of this application provides a message sending method. The method may include:

A network device obtains a CQI configuration or an SRS configuration in a TDM configuration ambiguity period.

The network device determines, when the CQI configuration changes, whether a CQI sent by a terminal device is received, or the network device determines, when the SRS configuration changes, whether an SRS sent by a terminal device is received, where the SRS is for determining a corresponding TA measurement value.

The CQI and the TA measurement value are discarded if the network device receives the CQI sent by the terminal device and determines the TA measurement value based on the SRS.

According to an eighth aspect, an embodiment of this application provides a network device. The network device may include:

- a sending unit, configured to send first RRC reconfiguration signaling to a terminal device, where the first RRC reconfiguration signaling carries a first configuration, and the first RRC reconfiguration signaling indicates the terminal device to make the first configuration effective or make the first configuration ineffective; and
- a receiving unit, configured to receive first RRC reconfiguration complete signaling sent by the terminal device, where the first RRC reconfiguration complete signaling indicates that the first configuration has been effective or the first configuration has been ineffective.

Optionally, with reference to the eighth aspect, in a first possible implementation, the first RRC reconfiguration signaling further carries a second configuration and a handover configuration, the handover configuration indicates the terminal device to hand over a first user instance to a second user instance in a first cell, and the network device covers the first cell.

The receiving unit is further configured to receive the first RRC reconfiguration complete signaling on the second user instance, where the first RRC reconfiguration complete signaling indicates that the first configuration and the second configuration have been effective on the second user instance or the first configuration and the second configuration have been ineffective on the second user instance.

Optionally, with reference to the eighth aspect, in a second possible implementation, the sending unit is further configured to: when the first RRC reconfiguration signaling indicates the terminal device to make the first configuration effective, before the network device sends the first RRC reconfiguration signaling to the terminal device, send second RRC reconfiguration signaling to the terminal device, where the second RRC reconfiguration signaling carries a second configuration, and the second RRC reconfiguration signaling indicates the terminal device to modify the second configuration and make a modified second configuration effective.

The receiving unit is configured to receive second RRC reconfiguration complete signaling sent by the terminal device.

Optionally, with reference to the eighth aspect, in a third possible implementation, the sending unit is further configured to: when the first RRC reconfiguration signaling indicates the terminal device to make the first configuration ineffective, after the network device receives the first RRC reconfiguration complete signaling sent by the terminal device, send third RRC reconfiguration signaling to the terminal device, where the third RRC reconfiguration signaling carries a second configuration, and the third RRC reconfiguration signaling indicates the terminal device to modify the second configuration and make a modified second configuration effective.

The receiving unit is configured to receive third RRC reconfiguration complete signaling sent by the terminal device.

According to a ninth aspect, an embodiment of this application provides a terminal device. The terminal device may include:

- a receiving unit, configured to receive first RRC reconfiguration signaling sent by a network device, where the first RRC reconfiguration signaling carries a first configuration;
- a processing unit, configured to make the first configuration effective or makes the first configuration ineffective based on the first RRC reconfiguration signaling; and
- a sending unit, configured to send first RRC reconfiguration complete signaling to the network device, where the first RRC reconfiguration complete signaling indicates that the first configuration has been effective or the first configuration has been ineffective.

Optionally, with reference to the eighth aspect, in a first possible implementation, the first RRC reconfiguration signaling further carries a second configuration and a handover configuration, and the terminal device further includes a handover unit.

The handover unit is configured to hand over a first user instance to a second user instance in a first cell based on the handover configuration.

Correspondingly, the processing unit is configured to make the first configuration effective or make the first configuration ineffective, and make the second configuration effective or make the second configuration ineffective on the second user instance.

Correspondingly, the sending unit is configured to send the first RRC reconfiguration complete signaling to the network device on the second user instance, where the first RRC reconfiguration complete signaling indicates that the first configuration and the second configuration have been effective on the second user instance or the first configuration and the second configuration have been ineffective on the second user instance.

Optionally, with reference to the eighth aspect, in a second possible implementation, the receiving unit is further configured to: before the first configuration is made effective based on the first RRC reconfiguration signaling, receive second RRC reconfiguration signaling sent by the network device, where the second RRC reconfiguration signaling carries a second configuration.

The processing unit is configured to modify the second configuration based on the second RRC reconfiguration signaling, and make a modified second configuration effective.

The sending unit is configured to send second RRC reconfiguration complete signaling to the network device.

Optionally, with reference to the second aspect, in a third possible implementation, the receiving unit is further configured to: after the terminal device sends the first RRC reconfiguration complete signaling to the network device, and when the first RRC reconfiguration complete signaling indicates that the first configuration has been ineffective, receive third RRC reconfiguration signaling sent by the network device, where the third RRC reconfiguration signaling carries a second configuration.

The processing unit is configured to modify the second configuration based on the third RRC reconfiguration signaling, and make a modified second configuration effective.

The sending unit is configured to send third RRC reconfiguration complete signaling to the network device.

According to a tenth aspect, an embodiment of this application provides a network device. The network device may include:

an obtaining unit, configured to obtain an SR configuration in a TDM configuration ambiguity period; and a sending unit, configured to send a first scheduling instruction to a terminal device when the SR configuration changes, where the first scheduling signaling indicates the terminal device to send uplink data.

Optionally, with reference to the tenth aspect, in a first possible implementation, the sending unit is configured to send the first scheduling signaling to the terminal device based on a preset period.

Optionally, with reference to the tenth aspect, in a second possible implementation, the network device further includes a detection unit, configured to: before the first scheduling instruction is sent to the terminal device, detect an SR on a first PUCCH, and detecting an SR on a second PUCCH, where the first PUCCH is a channel pointed to before the SR configuration changes, and the second PUCCH is a channel pointed to after the SR configuration changes.

Correspondingly, the sending unit is configured to send the first scheduling instruction to the terminal device when the SR is detected on the first PUCCH or the SR is detected on the second PUCCH.

According to an eleventh aspect, an embodiment of this application provides a terminal device. The terminal device may include:

a receiving unit, configured to receive a first scheduling instruction sent by a network device when an SR configuration changes, where the SR configuration is obtained by the network device in a TDM configuration ambiguity period; and a sending unit, configured to send uplink data based on the first scheduling instruction.

According to a twelfth aspect, an embodiment of this application provides a network device. The network device may include:

an obtaining unit, configured to obtain a TDM configuration in a TDM configuration ambiguity period;

a calculation unit, configured to calculate a first air interface moment and a second air interface moment based on the TDM configuration, where the first air interface moment is a moment at which a terminal device feeds back downlink response signaling in a first scheduling period, the second air interface moment is a moment at which the terminal device sends uplink data in the first scheduling period, and the first air interface moment does not overlap the second air interface moment; and a sending unit, configured to receive, at the first air interface moment, the downlink response signaling sent by the terminal device, or receive, at the second air interface moment, the uplink data sent by the terminal device.

According to a thirteenth aspect, an embodiment of this application provides a terminal device. The terminal device may include:

a sending unit, configured to send downlink response signaling to a network device at a first air interface moment, or send uplink data to the network device at a second air interface moment, where the first air interface moment does not overlap the second air interface moment, the first air interface moment is a moment at which the terminal device feeds back the downlink response signaling in a first scheduling period, and the second air interface moment is a moment at which the terminal device sends the uplink data in the first scheduling period.

According to a fourteenth aspect, an embodiment of this application provides a network device. The network device may include:

an obtaining unit, configured to obtain a CQI configuration or an SRS configuration in a TDM configuration ambiguity period;

a determining unit, configured to determine, when the CQI configuration changes, whether a CQI sent by a terminal device is received, or determine, by the network device when the SRS configuration changes, whether an SRS sent by a terminal device is received, where the SRS is for determining a corresponding TA measurement value; and a discarding unit, configured to discard the CQI and the TA measurement value if the network device receives the CQI sent by the terminal device and determines the TA measurement value based on the SRS.

According to a fifteenth aspect, an embodiment of this application provides a computer-readable storage medium, including instructions. When the instructions are run on a computer, the computer is enabled to perform the method according to any one of the first aspect or the possible implementations of the first aspect, any one of the third aspect or the possible implementations of the third aspect, any one of the fifth aspect or the possible implementations of the fifth aspect, or any one of the seventh aspect or the possible implementations of the seventh aspect.

According to a sixteenth aspect, an embodiment of this application provides a computer-readable storage medium, including instructions. When the instructions are run on a computer, the computer is enabled to perform the method according to any one of the second aspect or the possible implementations of the second aspect, any one of the fourth aspect or the possible implementations of the fourth aspect, or any one of the sixth aspect or the possible implementations of the sixth aspect.

According to a seventeenth aspect, an embodiment of this application provides a computer program product including instructions. When the computer program product runs on a computer, the computer is enabled to perform the method according to any one of the first aspect or the possible implementations of the first aspect, any one of the third aspect or the possible implementations of the third aspect, any one of the fifth aspect or the possible implementations of the fifth aspect, or any one of the seventh aspect or the possible implementations of the seventh aspect.

According to an eighteenth aspect, an embodiment of this application provides a computer program product including instructions. When the computer program product runs on a computer, the computer is enabled to perform the method according to any one of the second aspect or the possible implementations of the second aspect, any one of the fourth aspect or the possible implementations of the fourth aspect, or any one of the sixth aspect or the possible implementations of the sixth aspect.

According to a nineteenth aspect, an embodiment of this application provides a chip system. The chip system includes a processor, configured to support a first terminal device in implementing the function in any one of the first aspect or the possible implementations of the first aspect, any one of the third aspect or the possible implementations of the third aspect, any one of the fifth aspect or the possible implementations of the fifth aspect, or any one of the seventh aspect or the possible implementations of the seventh aspect. In a possible design, the chip system further includes a memory. The memory is configured to store program instructions and data for an information generation device. The chip system may include a chip, or may include the chip and another discrete device.

According to a twentieth aspect, an embodiment of this application provides a chip system. The chip system includes a processor, configured to support a server in implementing the function any one of the second aspect or the possible implementations of the second aspect, any one of the fourth aspect or the possible implementations of the fourth aspect, or any one of the sixth aspect or the possible implementations of the sixth aspect. In a possible design, the chip system further includes a memory. The memory is configured to store program instructions and data for an information generation device. The chip system may include a chip, or may include the chip and another discrete device.

It can be learned from the foregoing technical solutions that embodiments of this application have the following advantages.

In embodiments of this application, the network device sends the first RRC reconfiguration signaling to the terminal device, so that the terminal device can make the first configuration effective or make the first configuration ineffective based on the first RRC reconfiguration signaling, and then the terminal device can feed back the first RRC reconfiguration complete signaling to the network device. This ensures that both the time sequences and the configurations on the network device side and the terminal device side can be aligned in the TDM configuration ambiguity period, to reduce the bit error rate and the call drop rate.

BRIEF DESCRIPTION OF DRAWINGS

To describe technical solutions in embodiments of this application more clearly, the following briefly describes the accompanying drawings used in describing embodiments. The accompanying drawings in the following descriptions show merely some embodiments of this application.

DETAILED DESCRIPTION

Embodiments of this disclosure provide a message sending method, a device, and a storage medium, so that it is ensured that both time sequences and configurations on a network device side and a terminal device side can be aligned in a TDM configuration ambiguity period, to reduce a bit error rate and a call drop rate.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that embodiments of this application described herein can be implemented in an order other than the orders illustrated or described herein. In addition, the terms "include", "have", and any variant thereof are intended to cover non-exclusive inclusion. For example, a process, method, system, product, or device that includes a list of steps or units is not necessarily limited to those expressly listed steps or units, but may include other steps or units not expressly listed or inherent to such a process, method, product, or device.

The following describes technical solutions in this application with reference to accompanying drawings.

Figure 1:
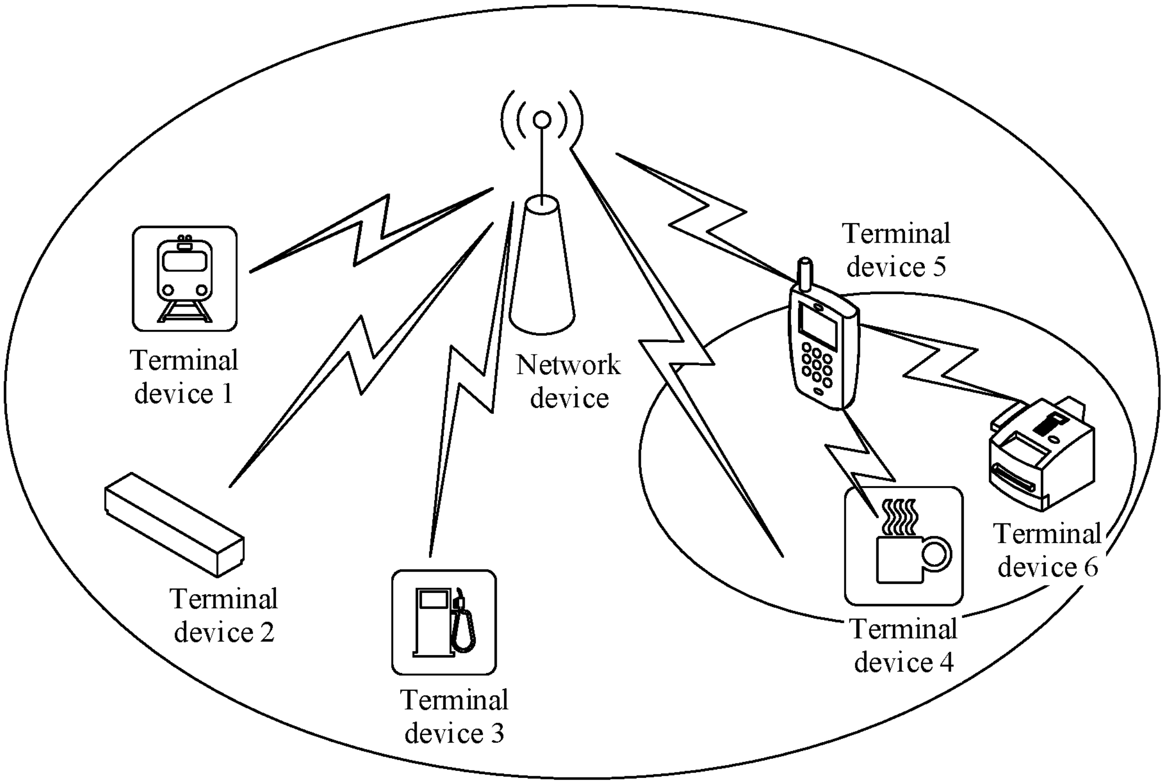
FIG. 1 is a schematic diagram of a structure of a possible radio access network RAN according to an embodiment of the present disclosure.

FIG. 1 is a schematic diagram of a structure of a possible radio access network (RAN) according to an embodiment of this application. The RAN may be a base station access system in a 2G network (the RAN includes a base station and a base station controller), may be a base station access system in a 3G network (the RAN includes a base station and an RNC), may be a base station access system in a 4G network (the RAN includes an eNB and an RNC), or may be a base station access system in a 5G network. This is not limited in this embodiment of this application.

The RAN includes one or more network devices. The network device may be any device having a wireless transceiver function or a chip disposed in the device having the wireless transceiver function. The network device includes but is not limited to a base station (for example, a base station BS, a NodeB NodeB, an evolved NodeB eNodeB or eNB, a gNodeB gNodeB or gNB in a 5th generation 5G communication system, a base station in a future communication system, an access node in a Wi-Fi system, a wireless relay node, or a wireless backhaul node) and the like. The base station may be a macro base station, a micro base station, a picocell base station, a small cell, a relay station, or the like. The base station may include one or more co-site or non-co-site transmission reception points (TRPs). The network device may alternatively be a radio controller, a central unit (CU), a distributed unit (DU), or a base station in a cloud radio access network (CRAN) scenario. That the network device is a base station is used as an example for description below. The plurality of network devices may be base stations of a same type, or may be base stations of different types.

As shown in FIG. 1, the base station may communicate with a plurality of terminal devices, to form a communication system. For example, the base station may communicate with a terminal device such as a terminal device 1, a terminal device 2, a terminal device 3, a terminal device 4, a terminal device 5, or a terminal device 6. In some embodiments, a quantity of terminal devices is not limited in this embodiment of this application. The plurality of terminal devices may support communication with a plurality of base stations using different technologies. For example, the terminal devices may support communication with a base station supporting an LTE network, may support communication with a base station supporting the 5G network, or may support dual connections to the base station in the LTE network and the base station in the 5G network. For example, a base station is a RAN node that connects a terminal device to a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a base band unit (BBU), or a wireless fidelity (Wi-Fi) access point (AP). In a network structure, the network device may include a central unit (CU) node, a distributed unit (DU) node, or a RAN device including the CU node and the DU node.

The terminal device is also referred to as user equipment (UE), a mobile station (MS), a mobile terminal (MT), a terminal, or the like, and is a device that provides voice and/or data connectivity for a user or a chip disposed in the device, for example, a handheld device or a vehicle-mounted device having a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home. The terminal device provided in embodiments of this application may be a low-complexity terminal device and/or a terminal device in a coverage enhancement A mode.

The communication system mentioned in embodiments of this application includes but is not limited to an LTE system, three application scenarios of a next-generation 5G mobile communication system: enhanced mobile broadband (eMBB), ultra-reliable low-latency communication (URLLC), and enhanced machine type communication (eMTC), or a new communication system emerging in the future.

The TDM configuration ambiguity period is also understood as a period of time after the network device delivers RRC reconfiguration information and before the network device receives RRC reconfiguration complete signaling sent by the terminal device.

Currently, a TDM configuration may cause a change of an SR configuration, a CQI configuration, an SRS configuration, a DRX configuration, or the like. Therefore, in a conventional technical solution, the network device delivers the TDM configuration and the SR configuration, the CQI configuration, the SRS configuration, the DRX configuration, or the like to the terminal device in a same piece of RRC reconfiguration signaling. In this way, after receiving the RRC reconfiguration signaling, the terminal device synchronously makes the TDM configuration and the SR configuration, the CQI configuration, the SRS configuration, the DRX configuration, or the like effective, and then the terminal device feeds back RRC reconfiguration complete signaling to the network device.

However, due to existence of the TDM configuration ambiguity period, the network device in the duration cannot know when the terminal device feeds back the RRC reconfiguration complete signaling, and the network device does not know when the terminal device learns of a changed TDM configuration. Consequently, a time sequence and a configuration on a network device side in the duration cannot be aligned with a time sequence and a configuration on a terminal device side, and a bit error and a call drop occur. In addition, before and after the TDM configuration is effective, the SR configuration, the CQI configuration, the SRS configuration, the DRX configuration, or the like changes to a great extent. Therefore, in the TDM configuration ambiguity period, uplink data may fail to be scheduled due to incorrect SR detection. Alternatively, a downlink index selection problem may be caused due to unreliable CQI reporting value. Alternatively, a TA measurement value of an SRS may be incorrectly adjusted due to unreliable SRS measurement. Alternatively, an uplink scheduling failure may be caused due to non-aligned DRX configurations, and so on. These problems may cause the bit error and the call drop to a great extent in the TDM configuration ambiguity period.

Therefore, to resolve the foregoing problems in a conventional technology, in embodiments of this application, a new solution is provided for aligning time sequenced and configurations in the TDM configuration ambiguity period, to avoid a data receiving and sending failure caused by the bit error and the call drop that occur because the time sequences and the configurations on the network device side and the terminal device side cannot be aligned in the TDM configuration ambiguity period in the conventional technology.

Figure 2:
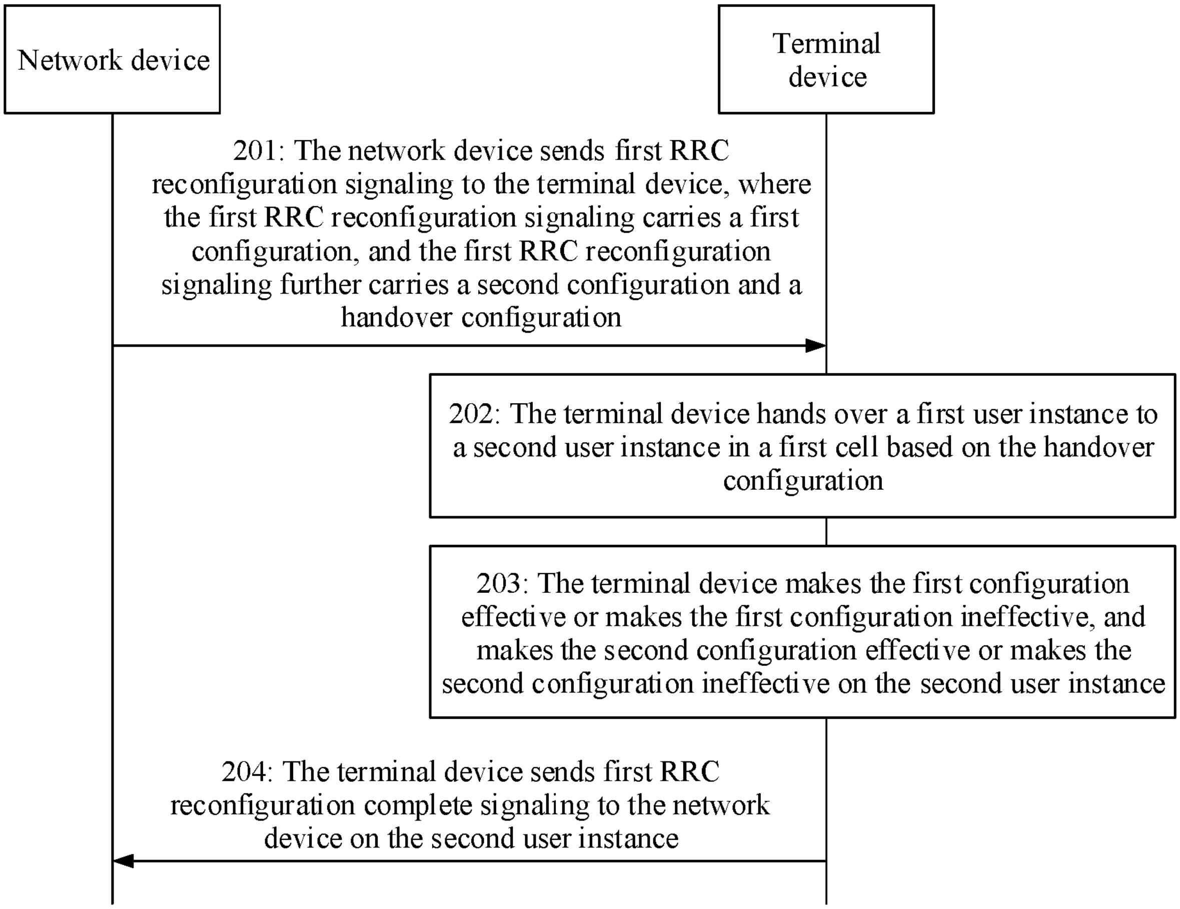
FIG. 2 is a schematic diagram of an embodiment of a message sending method according to an embodiment of the present disclosure.

The message sending method provided in embodiments of this application is applicable to a scenario in which time sequences and configurations are aligned in the TDM configuration ambiguity period. FIG. 2 is a schematic diagram of an embodiment of a message sending method according to an embodiment of this application. The method may include the following steps.

201: A network device sends first RRC reconfiguration signaling to a terminal device, where the first RRC reconfiguration signaling carries a first configuration, a second configuration, and a handover configuration.

In this embodiment, because the first configuration causes a change of the second configuration, the network device may deliver both the first configuration and the second configuration to the terminal device in the first RRC reconfiguration signaling. It may be understood that the first configuration may include a TDM configuration, and the second configuration may include but is not limited to an SR configuration, a CQI configuration, an SRS configuration, or a DRX configuration. This is not specifically limited and described in this embodiment of this application. In addition, the network device may further deliver the handover configuration to the terminal device by using the first RRC reconfiguration signaling, so that the terminal device implements, based on the handover configuration, user instance handover in a first cell covered by the network device.

202: The terminal device hands over a first user instance to a second user instance in the first cell based on the handover configuration.

In this embodiment, the network device allocates a user instance to each newly accessed call, and time sequences and configurations on a network device side and a terminal device side cannot be aligned in a TDM configuration ambiguity period. Therefore, in this embodiment of this application, a user instance, namely, the first user instance, used when the network device sends the first RRC reconfiguration signaling is no longer used. In this way, after receiving the first RRC reconfiguration signaling sent by the network device, the terminal device no longer feeds back first RRC reconfiguration complete signaling on the first user instance, but performs, under an indication of the handover configuration included in the first RRC reconfiguration signaling, intra-cell handover in the first cell covered by the network device. In other words, it is understood as that the terminal device hands over the first user instance to the second user instance in the first cell. In this way, the terminal device can make the first configuration and the second configuration effective or ineffective on the second user instance.

203: The terminal device makes the first configuration effective or makes the first configuration ineffective, and makes the second configuration effective or makes the second configuration ineffective on the second user instance.

In this embodiment, that the terminal device makes the first configuration and the second configuration effective may also be understood as that the terminal device enters the TDM configuration under an indication of the network device, and that the terminal device makes the first configuration and the second configuration ineffective may also be understood as that the terminal device exits the TDM configuration under an indication of the network device. The terminal device makes the first configuration and the second configuration effective, or makes the first configuration and the second configuration ineffective on the second user instance, so that a configuration on the second user instance is a new configuration and a new time sequence.

204: The terminal device sends the first RRC reconfiguration complete signaling to the network device on the second user instance.

In this embodiment, after making the first configuration and the second configuration effective on the second user instance, or making the first configuration and the second configuration ineffective on the second user instance, the terminal device may initiate a contention-free access request to the network device, to request to reconnect to the network device. In addition, because the configuration on the second user instance is the new configuration and the new time sequence, the terminal device can send the first RRC reconfiguration complete signaling to the network device on the second user instance, so that the network device can also receive the first RRC reconfiguration complete signaling based on the second user instance. In this way, it is ensured that both the network device and the terminal device can receive and send a message on the second user instance in the TDM configuration ambiguity period, thereby avoiding a problem that a bit error rate and a call drop rate increase because time sequences and configurations cannot be aligned when the network device and the terminal device still use the first user instance to receive and send a message.

Figure 3:
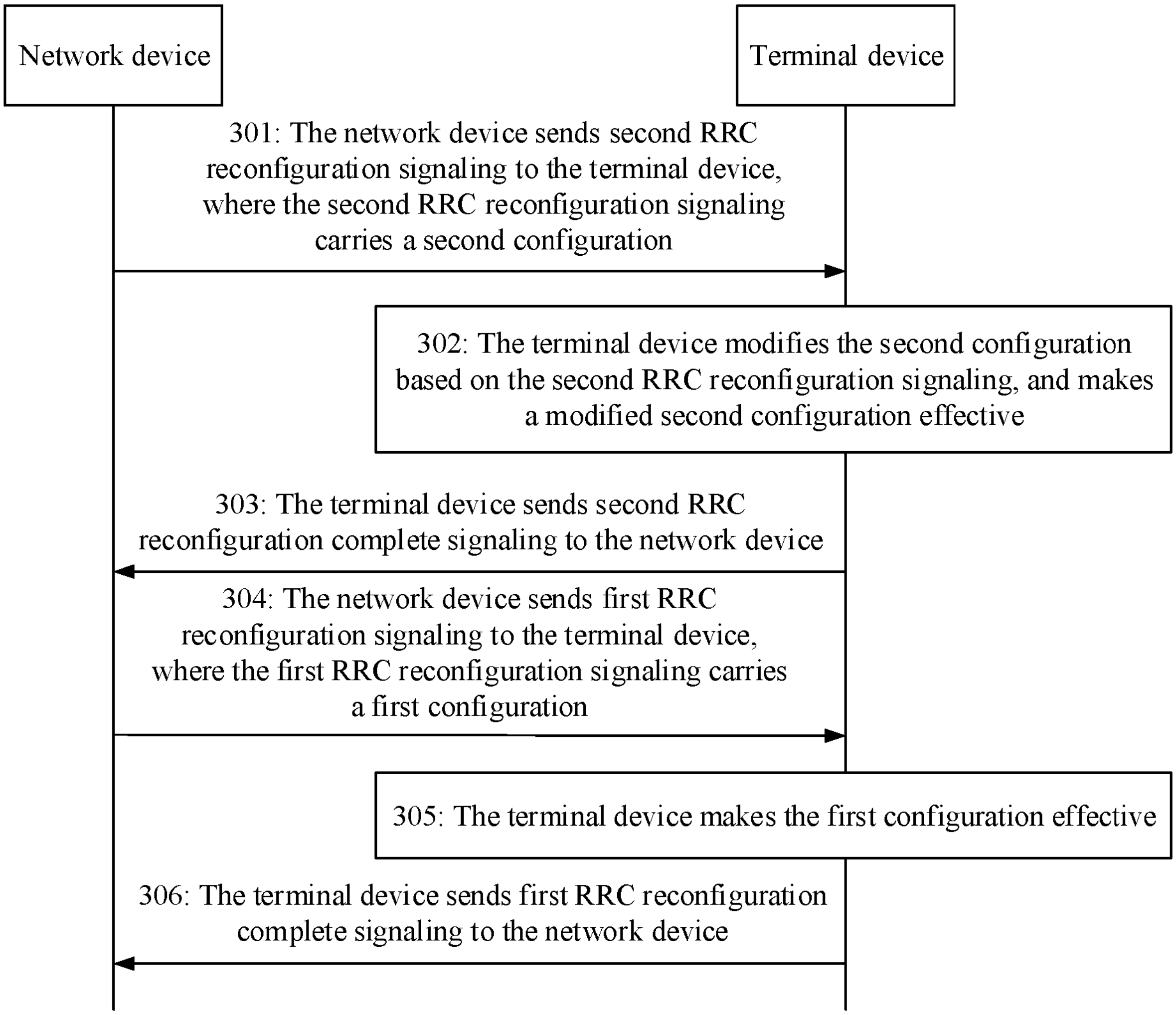
FIG. 3 is a schematic diagram of another embodiment of a message sending method according to an embodiment of the present disclosure.

The embodiment described in FIG. 2 mainly describes in detail, from the perspective of intra-cell handover, a case in which the problem that the time sequences and the configurations cannot be aligned is avoided in the TDM configuration ambiguity period. The following avoids, from a perspective of using two or more pieces of RRC reconfiguration signaling by a network device, a problem that configurations cannot be aligned in a TDM configuration ambiguity period. FIG. 3 is a schematic diagram of another embodiment of a message sending method according to an embodiment of this application. The method may include the following steps.

301: A network device sends second RRC reconfiguration signaling to a terminal device, where the second RRC reconfiguration signaling carries a second configuration.

In this embodiment, because a first configuration causes a change of the second configuration, the network device may first separately send the second configuration to the terminal device by using the second RRC reconfiguration signaling, so that the terminal device can first modify the second configuration, and make a modified second configuration effective, to reduce impact of the first configuration on the second configuration.

302: The terminal device modifies the second configuration based on the second RRC reconfiguration signaling, and makes the modified second configuration effective.

303: The terminal device sends second RRC reconfiguration complete signaling to the network device.

In this embodiment, after modifying the second configuration and making the modified second configuration effective, the terminal device may first feed back the second RRC reconfiguration complete signaling to the network device, so that the network device and the terminal device can first align the second configuration, to avoid the change of the second configuration caused by the first configuration when the first configuration and the second configuration are synchronously sent.

304: The network device sends first RRC reconfiguration signaling to the terminal device, where the first RRC reconfiguration signaling carries the first configuration.

In this embodiment, because the first configuration causes the change of the second configuration, the network device first indicates, by using the second RRC reconfiguration signaling, the terminal device to modify the second configuration and make the modified second configuration effective, and then receives the second RRC reconfiguration complete signaling fed back by the terminal device, to align the second configuration. In this way, the network device then sends the first RRC reconfiguration signaling to the terminal device, so that the terminal device can also make the first configuration effective based on the first RRC reconfiguration signaling.

305: The terminal device makes the first configuration effective.

In this embodiment, that the terminal device makes the first configuration effective may be understood as that the terminal device enters a TDM configuration under an indication of the network device.

306: The terminal device sends first RRC reconfiguration complete signaling to the network device.

In this embodiment, after making the first configuration effective, the terminal device sends the first RRC reconfiguration complete signaling to the network device, so that when receiving the first RRC reconfiguration complete signaling, the network device can learn when terminal device makes the first configuration effective. In this way, it is ensured that impact of the first configuration on the change of the second configuration is reduced in a TDM configuration ambiguity period, to ensure that a configuration of the network device is aligned with a configuration of the terminal device, and reduce a bit error rate and a call drop rate.

Figure 4:
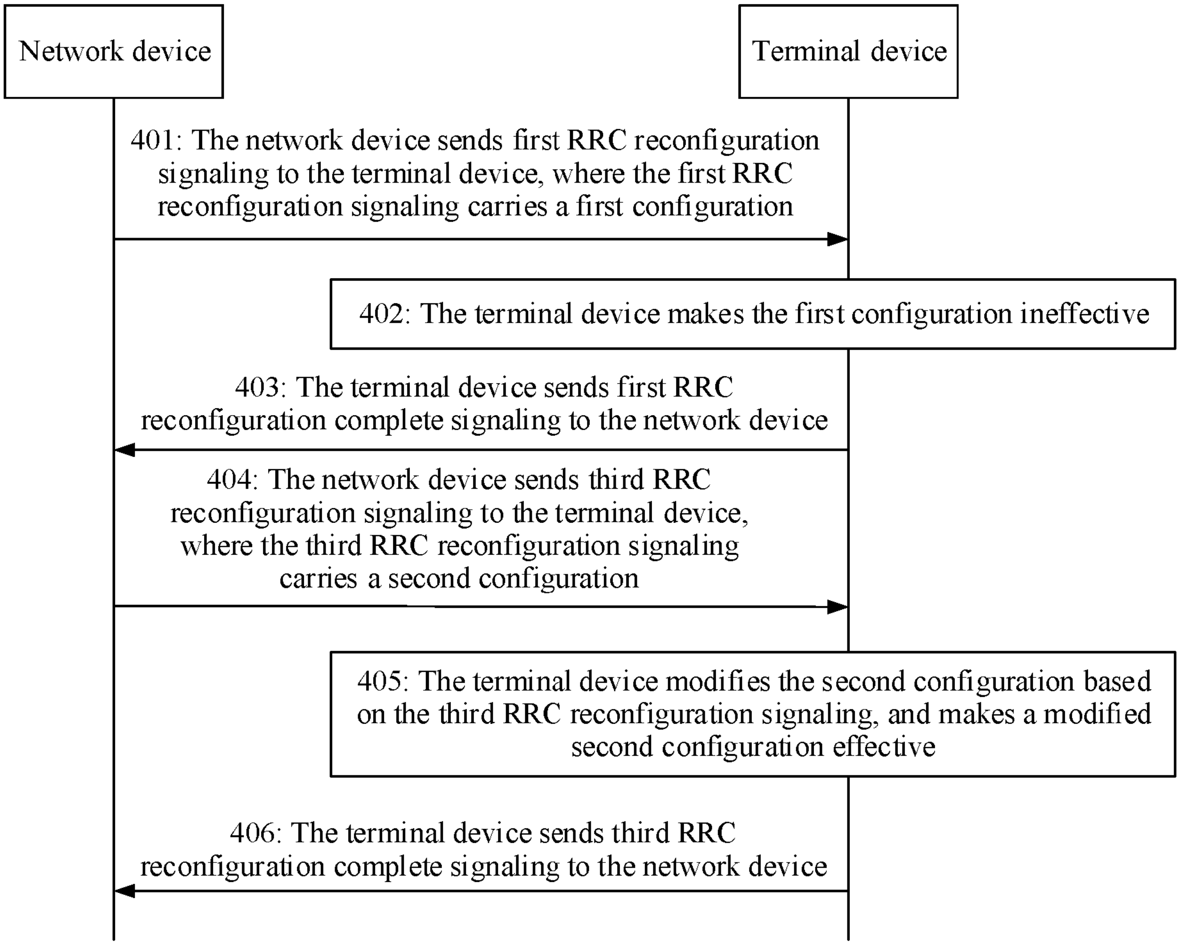
FIG. 4 is a schematic diagram of another embodiment of a message sending method according to an embodiment of the present disclosure.

Optionally, FIG. 3 mainly describes, from the perspective of using the two or more pieces of RRC reconfiguration signaling by the network device, a case in which the terminal device enters the TDM configuration to avoid the problem that the configurations cannot be aligned in the TDM configuration ambiguity period. The following describes, from a perspective of using two or more pieces of RRC reconfiguration signaling by a network device, a case in which a terminal device exits a TDM configuration to avoid a problem that configurations cannot be aligned in a TDM configuration ambiguity period. FIG. 4 is a schematic diagram of another embodiment of a message sending method according to an embodiment of this application. The method may include the following steps.

401: A network device sends first RRC reconfiguration signaling to a terminal device, where the first RRC reconfiguration signaling carries a first configuration.

In this embodiment, if the network device expects the terminal device to exit a TDM configuration in a TDM configuration ambiguity period, and the first configuration causes a change of a second configuration, the network device may first send the first RRC reconfiguration signaling to the terminal device, so that the terminal device first makes the first configuration ineffective based on the first RRC reconfiguration signaling.

402: The terminal device makes the first configuration ineffective.

In this embodiment, that the terminal device makes the first configuration ineffective may be understood as that the terminal device exits the TDM configuration under an indication of the network device.

403: The terminal device sends first RRC reconfiguration complete signaling to the network device.

In this embodiment, after making the first configuration ineffective, the terminal device sends the first RRC reconfiguration complete signaling to the network device, so that when receiving the first RRC reconfiguration complete signaling, the network device can learn when terminal device makes the first configuration ineffective. In this way, it is ensured that impact of the first configuration on the change of the second configuration is reduced in the TDM configuration ambiguity period, to ensure that a configuration of the network device is aligned with a configuration of the terminal device, and reduce a bit error rate and a call drop rate.

404: The network device sends third RRC reconfiguration signaling to the terminal device, where the third RRC reconfiguration signaling carries the second configuration.

In this embodiment, because the first configuration causes the change of the second configuration, when indicating the terminal device to exit the TDM configuration, the network device first indicates, by using the first RRC reconfiguration signaling, the terminal device to first make the first configuration ineffective, and then separately sends the second configuration to the terminal device by using the third RRC reconfiguration signaling, so that the terminal device can modify the second configuration and make a modified second configuration effective. In this way, impact of the first configuration on the second configuration can be reduced.

405: The terminal device modifies the second configuration based on the third RRC reconfiguration signaling, and makes the modified second configuration effective.

406: The terminal device sends third RRC reconfiguration complete signaling to the network device.

In this embodiment, after modifying the second configuration and making the modified second configuration effective, the terminal device feeds back the third RRC reconfiguration complete signaling to the network device, so that the network device and the terminal device can still implement configuration alignment after making the first configuration ineffective, to avoid a bit error and a call drop occur caused because the first configuration causes the change of the second configuration when the first configuration and the second configuration are synchronously sent.

Figure 5:
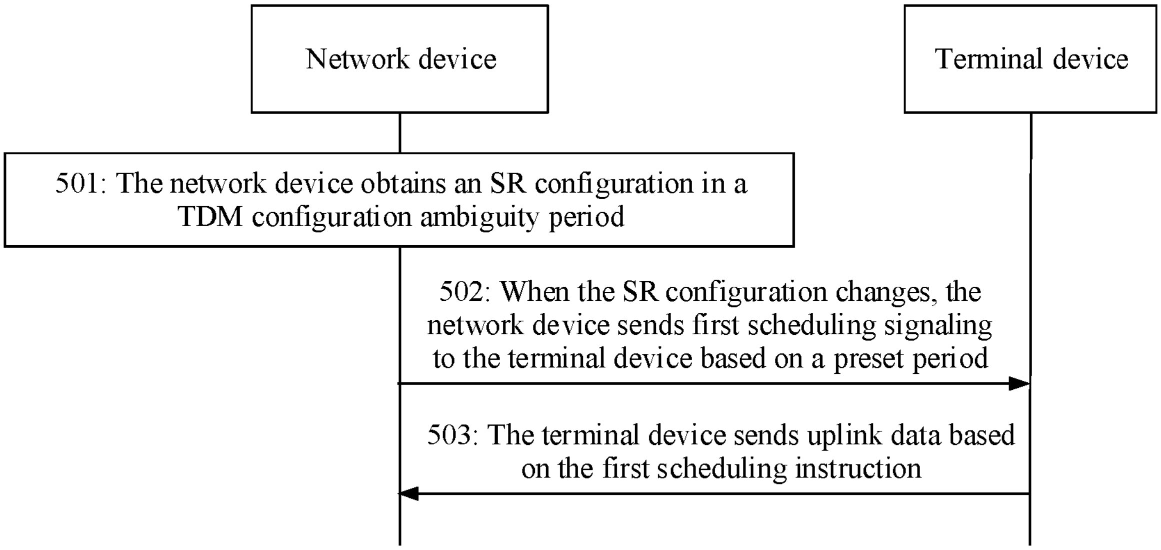
FIG. 5 is a schematic diagram of another embodiment of a message sending method according to an embodiment of the present disclosure.

In addition, because the second configuration may include but is not limited to an SR configuration, a CQI configuration, an SRS configuration, or a DRX configuration, once in the TDM configuration ambiguity period, if an SR detection error occurs because the SR configuration changes, the bit error and the call drop can still be caused because uplink data cannot be scheduled. Therefore, FIG. 5 is a schematic diagram of another embodiment of a message sending method according to an embodiment of this application. The method may include the following steps.

501: The network device obtains an SR configuration in a TDM configuration ambiguity period.

502: When the SR configuration changes, the network device sends first scheduling signaling to a terminal device based on a preset period.

503: The terminal device sends uplink data based on the first scheduling instruction.

In this embodiment, after obtaining the SR configuration in the TDM configuration ambiguity period, the network device determines whether the SR configuration changes. If the SR configuration changes, the network device may periodically trigger uplink scheduling once, to schedule a fixed data amount to send the uplink data. In such embodiments, when the SR configuration changes, the network device may send the first scheduling signaling to the terminal device based on the preset period, so that the terminal device can send the uplink data based on the first scheduling instruction. In this way, uplink scheduling is triggered based on a fixed period, so that the fixed data amount can be scheduled to send the uplink data, and a bit error rate and a call drop rate can still be reduced when an SR detection error occurs due to the change of the SR configuration in the TDM configuration ambiguity period.

Figure 6:
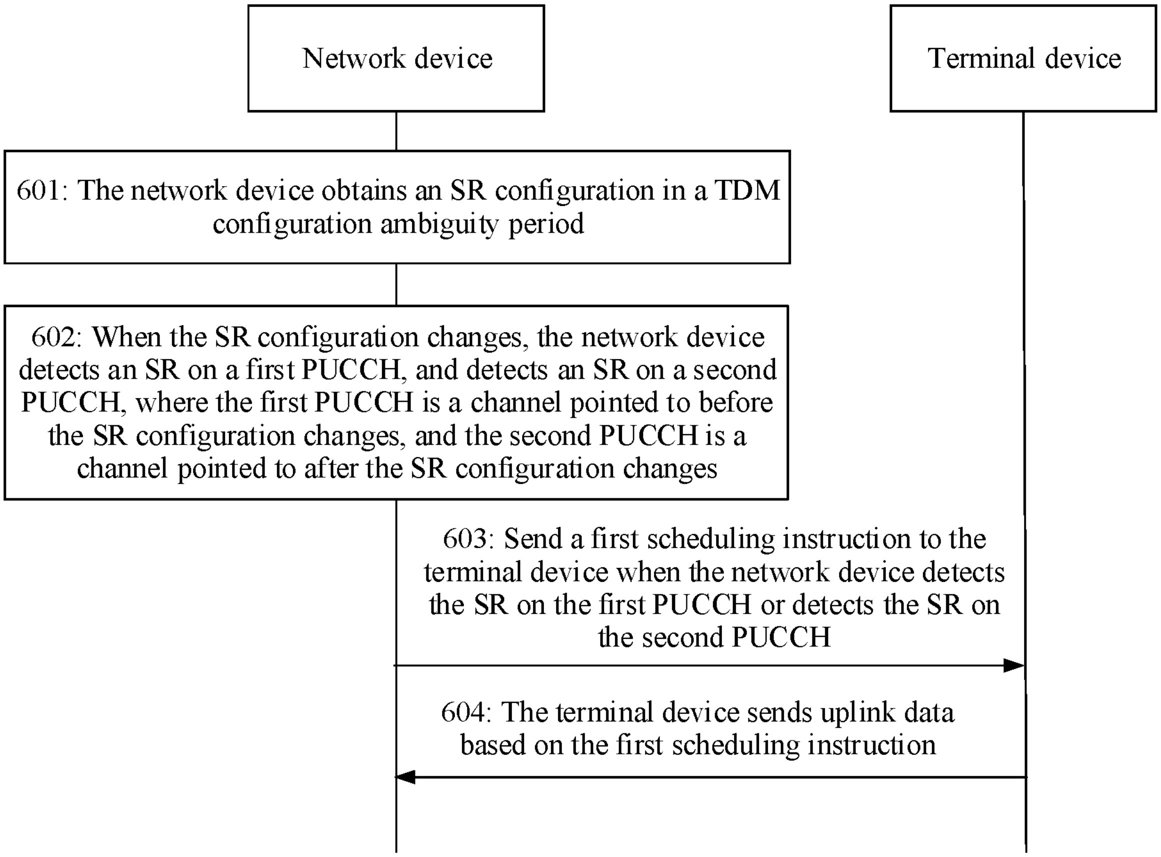
FIG. 6 is a schematic diagram of another embodiment of a message sending method according to an embodiment of the present disclosure.

Optionally, FIG. 5 mainly describes, from the perspective of the fixed period, the solution for scheduling the uplink data in the TDM configuration ambiguity period. The following describes, from a perspective of whether there is an SR, a solution for scheduling uplink data in a TDM configuration ambiguity period. Therefore, FIG. 6 is a schematic diagram of another embodiment of a message sending method according to an embodiment of this application. The method may include the following steps.

601: The network device obtains an SR configuration in a TDM configuration ambiguity period.

602: When the SR configuration changes, the network device detects an SR on a first PUCCH, and detects an SR on a second PUCCH, where the first PUCCH is a channel pointed to before the SR configuration changes, and the second PUCCH is a channel pointed to after the SR configuration changes.

603: Send a first scheduling instruction to a terminal device when the network device detects the SR on the first PUCCH or detects the SR on the second PUCCH.

In this embodiment, if an SR detection error occurs, it is easy that the network device cannot implement uplink scheduling, and a call drop is caused. Therefore, after obtaining the SR configuration in the TDM configuration ambiguity period, the network device determines whether the SR configuration changes. If the SR configuration changes, the network device may further detect an SR reported by the terminal device. If the SR is detected on the physical uplink control channel (PUCCH) separately pointed to before the SR configuration changes or after the SR configuration changes, the network device may send the first scheduling signaling to the terminal device, to trigger uplink scheduling, so that the terminal device can send uplink data based on the first scheduling instruction. In some embodiments, the network device may detect the SR on the first PUCCH, and detect the SR on the second PUCCH. If the SR is detected on the first PUCCH or the second PUCCH, the network device may trigger uplink scheduling.

It may be understood that the first PUCCH is the channel pointed to before the SR configuration changes, and the second PUCCH is the channel pointed to after the SR configuration changes. The first PUCCH may be the same as or different from the second PUCCH. This is not specifically limited and described in this embodiment of this application.

604: The terminal device sends the uplink data based on the first scheduling instruction.

In this way, after receiving the first scheduling instruction, the terminal device may send the uplink data based on the first scheduling instruction. In this way, whether the terminal device reports the SR is detected on the PUCCH pointed to after the SR configuration changes. If the terminal device reports an SR before and after the change, the network device triggers uplink scheduling, to send the uplink data. In addition, in the TDM configuration ambiguity period, if the SR detection error occurs because the SR configuration changes, a call drop rate can still be reduced.

Figure 7:
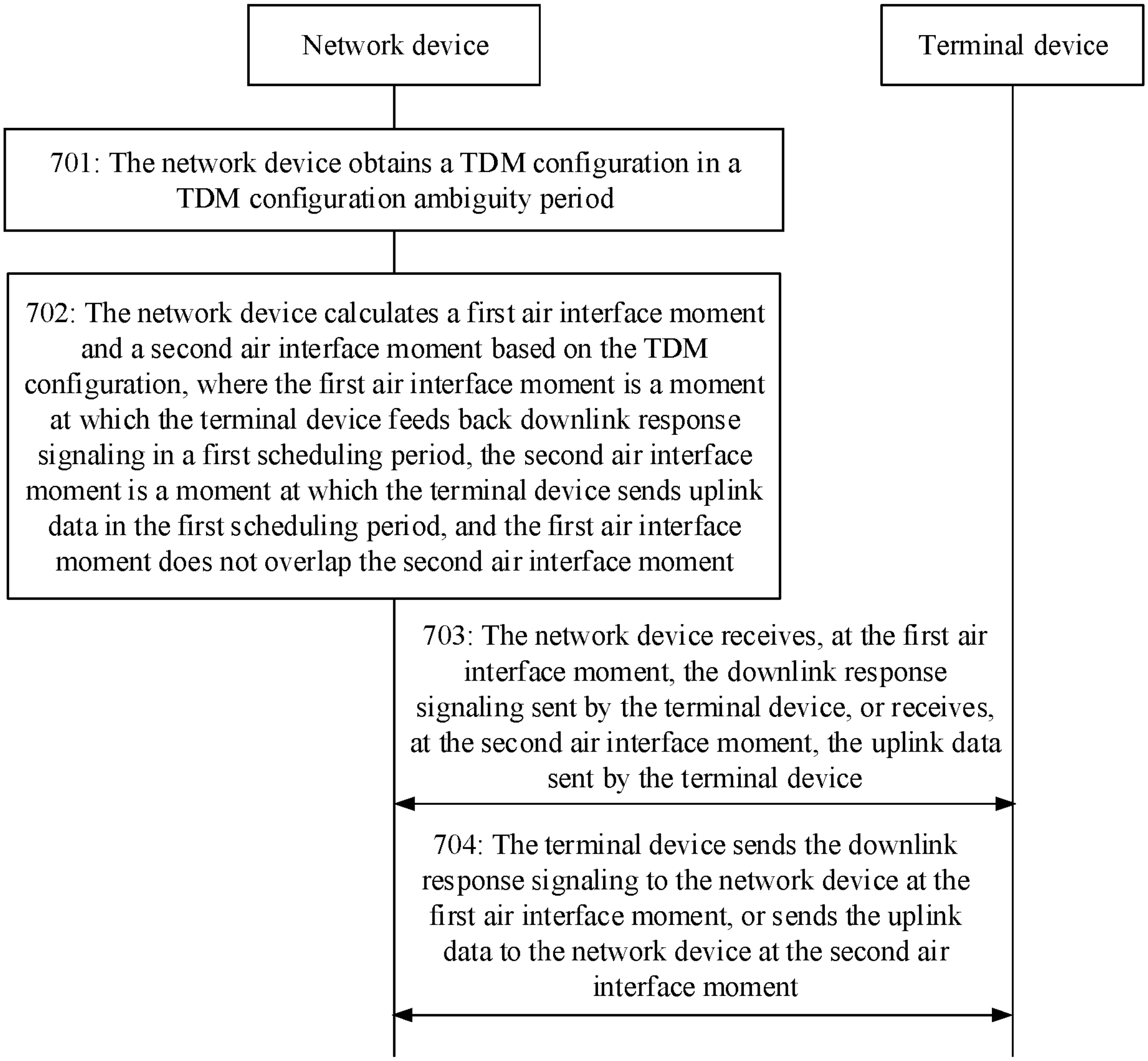
FIG. 7 is a schematic diagram of another embodiment of a message sending method according to an embodiment of the present disclosure.

In addition, in a TDM configuration ambiguity period, a quantity of bits used when a terminal device feeds back downlink response signaling to a network device cannot be determined for the network device. In addition, when the downlink response signaling is associated with a PUSCH, the network device may fail to correctly demodulate uplink data, and a call drop occurs. Therefore, FIG. 7 is a schematic diagram of another embodiment of a message sending method according to an embodiment of this application. The method may include the following steps.

701: A network device obtains a TDM configuration in a TDM configuration ambiguity period.

702: The network device calculates a first air interface moment and a second air interface moment based on the TDM configuration, where the first air interface moment is a moment at which a terminal device feeds back downlink response signaling in a first scheduling period, the second air interface moment is a moment at which the terminal device sends uplink data in the first scheduling period, and the first air interface moment does not overlap the second air interface moment.

703: The network device receives, at the first air interface moment, the downlink response signaling sent by the terminal device, or receives, at the second air interface moment, the uplink data sent by the terminal device.

704: The terminal device sends the downlink response signaling to the network device at the first air interface moment, or sends the uplink data to the network device at the second air interface moment.

In this embodiment, because in the TDM configuration ambiguity period, the downlink response signaling may be associated with a PUSCH, the network device may use a scheduling manner in which uplink scheduling and downlink scheduling are alternately performed.

When performing downlink scheduling in each first scheduling period, the network device first calculates, based on the TDM configuration, the moment at which the terminal device feeds back the downlink response signaling in the first scheduling period, and denotes the moment as the first air interface moment. In addition, when performing uplink scheduling in the first scheduling period, the network device further calculates, based on the TDM configuration, the moment at which the terminal device sends the uplink data in the first scheduling period, and denotes the moment as the second air interface moment.

In this case, the network device needs to ensure that the first air interface moment does not overlap the second air interface moment. In other words, the network device needs to ensure that the network device cannot receive, at the first air interface moment at which downlink scheduling is performed, the uplink data sent by the terminal device; or the network device cannot receive, at the second air interface moment at which uplink scheduling is performed, the downlink response signaling sent by the terminal device. In this way, in the scheduling manner in which uplink scheduling and downlink scheduling are alternately performed, it is ensured that there is no associated downlink response signaling on the PUSCH, thereby avoiding a bit error and a call drop that are caused by an uplink scheduling error that occurs because a quantity of bits used by the downlink response signaling cannot be determined.

It may be understood that the network device may ensure, based on a preset fixed period, through message exchange, or the like, that the first air interface moment does not overlap the second air interface moment. This is not specifically limited in this embodiment of this application. After the network device triggers downlink scheduling, the terminal device makes a corresponding response based on downlink data. In this case, the network device may receive the downlink response signaling sent by the terminal device at the first air interface moment. In this case, the network device needs to send a notification message to an uplink scheduling module by using a downlink scheduling module of the network device, to notify the uplink scheduling module that the uplink data sent by the terminal device at the first air interface moment does not need to be scheduled.

In addition, after triggering uplink scheduling, the network device may also receive, at the second air interface moment, the uplink data sent by the terminal device. In this case, the network device still needs to send a notification message to the downlink scheduling module by using the uplink scheduling module of the network device, to notify the downlink scheduling module to stop sending the downlink data to the terminal device, to avoid receiving the downlink response signaling fed back by the terminal device at the second air interface moment. In this way, based on non-overlapping between the first air interface moment and the second air interface moment, the downlink response signaling and the uplink data that are sent by the terminal device are alternately received.

Figure 8:
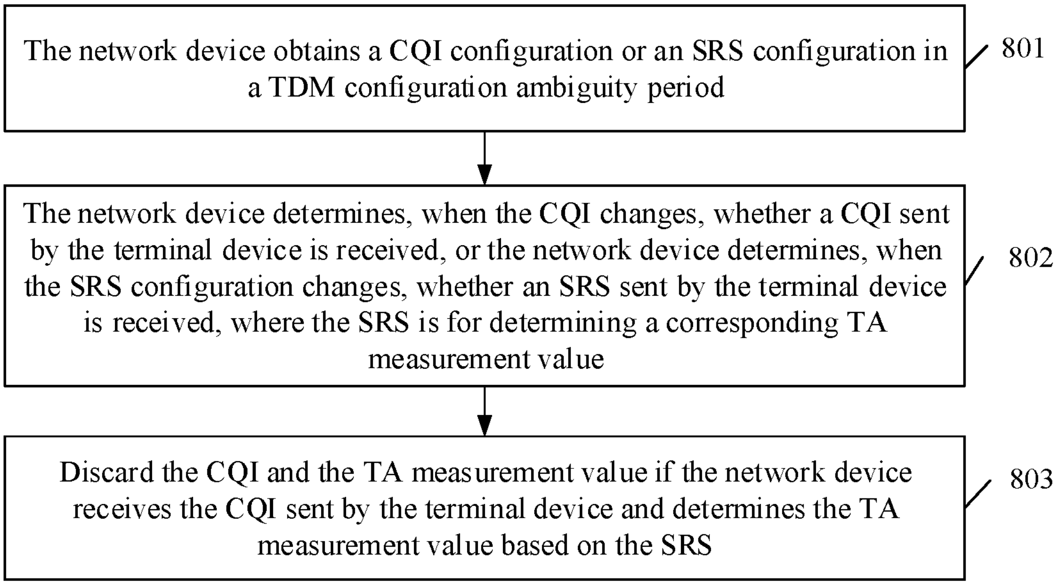
FIG. 8 is a schematic diagram of another embodiment of a message sending method according to an embodiment of the present disclosure.

In addition, in the TDM configuration ambiguity period, a downlink scheduling problem may be caused due to an unreliable reported CQI value, or a TA measurement value of an SRS may be incorrectly adjusted due to unreliable SRS measurement. These factors affect a bit error rate and a call drop. Therefore, FIG. 8 is a schematic diagram of another embodiment of a message sending method according to an embodiment of this application. The method may include the following steps.

801: A network device obtains a CQI configuration or an SRS configuration in a TDM configuration ambiguity period.

802: The network device determines, when the CQI configuration changes, whether a CQI sent by a terminal device is received, or the network device determines, when the SRS configuration changes, whether an SRS sent by a terminal device is received, where the SRS is for determining a corresponding TA measurement value.

803: Discard the CQI and the TA measurement value if the network device receives the CQI sent by the terminal device and determines the TA measurement value based on the SRS.

In this embodiment, the CQI configuration and the SRS configuration respectively specify a location and reporting time of the CQI, and a location and reporting time of the SRS. In the TDM configuration ambiguity period, after obtaining the CQI configuration or the SRS configuration, the network device determines that the CQI configuration or the SRS configuration has changed. If the network device receives, based on a changed CQI configuration or SRS configuration, the CQI and the SRS sent by the terminal device, the CQI and the SRS that are detected by the network device are likely to be inaccurate. Therefore, in this case, when determining that the CQI configuration or the SRS configuration has changed, the network device can further receive the CQI and the SRS that are reported by the terminal device, and the network device needs to further detect the TA measurement value based on the SRS. In this way, when receiving the CQI and detecting the TA measurement value based on the SRS, the network device may discard the CQI and the TA measurement value. Otherwise, the network device still uses the CQI and the TA measurement value for scheduling, and a bit error and a call drop are easily caused.

The foregoing mainly describes the solutions provided in embodiments of this application from a perspective of the method. It may be understood that, to implement the foregoing functions, the network device and the terminal device each include corresponding hardware structures and/or software modules for performing the functions. A person skilled in the art should be easily aware that, in combination with the functions described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the functions of each particular application, but it should not be considered that the implementation goes beyond the scope of this application.

From a perspective of a physical device, the network device and the terminal device each may be implemented by one physical device, may be jointly implemented by a plurality of physical devices, or may be a logical functional unit in one physical device. This is not specifically limited in embodiments of this application.

Figure 9:
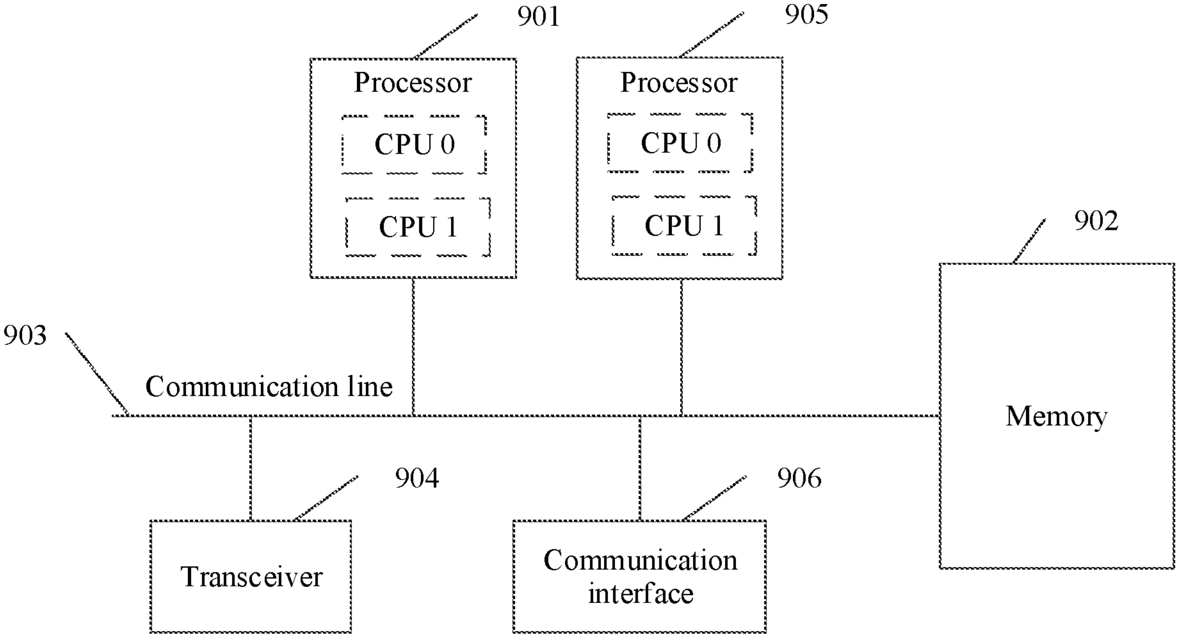
FIG. 9 is a schematic diagram of a hardware structure of a communication device according to an embodiment of the present disclosure.

For example, the network device and the terminal device each may be implemented by a communication device in FIG. 9. FIG. 9 is a schematic diagram of a hardware structure of a communication device according to an embodiment of this application. The communication device includes at least one processor 901, a memory 902, a communication line 903, and a transceiver 904.

The processor 901 may be a general-purpose central processing unit (CPU), a microprocessor, an application-specific integrated circuit (ASIC), or one or more integrated circuits configured to control program execution of the solutions in this application.

The communication line 903 may include a path on which information is transferred between the foregoing components.

The transceiver 904 uses any apparatus such as a transceiver, and is configured to communicate with another device or a communication network such as the ethernet, a radio access network (RAN), or a wireless local area network (WLAN). The transceiver 904 may alternatively be a transceiver circuit or a transceiver. The communication device may also include a communication interface 906.

The memory 902 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be for carrying or storing expected program code in a form of instructions or a data structure and that can be accessed by a computer. However, the memory 902 is not limited thereto. The memory may exist alone, and is connected to the processor 901 through the communication line 903. Alternatively, the memory 902 and the processor 901 may be integrated together.

The memory 902 is configured to store computer-executable instructions for executing the solutions in this application, and the processor 901 controls the execution. The processor 901 is configured to execute the computer-executable instructions stored in the memory 902, to implement the message sending methods provided in the foregoing method embodiments of this application.

In a possible implementation, the computer-executable instructions in this embodiment of this application may also be referred to as application program code. This is not specifically limited in this embodiment of this application.

In an embodiment, the processor 901 may include one or more CPUs such as a CPU 0 and a CPU 1 in FIG. 9.

During specific implementation, in an embodiment, the communication device may include a plurality of processors such as the processor 901 and a processor 905 in FIG. 9. Each of the processors may be a single-core (single-CPU) processor, or may be a multi-core (multi-CPU) processor. The processor herein may be one or more devices, circuits, and/or processing cores configured to process data (for example, computer-executable instructions).

From a perspective of functional units, in this application, the network device and the terminal device may be divided into functional units based on the foregoing method embodiments. For example, each functional unit may be obtained through division based on each corresponding function, or two or more functions may be integrated into one functional unit. The integrated functional unit may be implemented in a form of hardware, or may be implemented in a form of a software functional unit.

Figure 10:
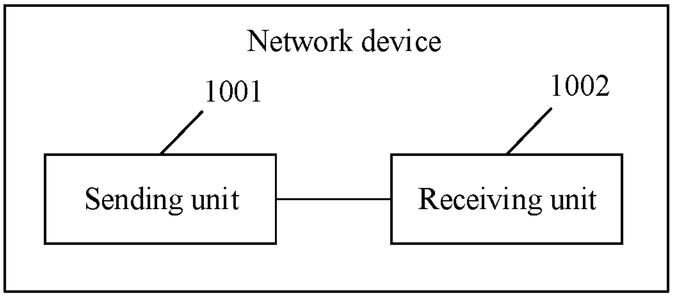
FIG. 10 is a schematic diagram of a structure of a network device according to an embodiment of the present disclosure.

For example, when the functional units are obtained through division in an integrated manner, FIG. 10 is a schematic diagram of a structure of a network device. As shown in FIG. 10, an embodiment of the network device in this application may include:

a sending unit 1001, configured to send first RRC reconfiguration signaling to a terminal device, where the first RRC reconfiguration signaling carries a first configuration, and the first RRC reconfiguration signaling indicates the terminal device to make the first configuration effective or make the first configuration ineffective; and a receiving unit 1002, configured to receive first RRC reconfiguration complete signaling sent by the terminal device, where the first RRC reconfiguration complete signaling indicates that the first configuration has been effective or the first configuration has been ineffective.

In some embodiments of this application, the first RRC reconfiguration signaling further carries a second configuration and a handover configuration, the handover configuration indicates the terminal device to hand over a first user instance to a second user instance in a first cell, and the network device covers the first cell. The receiving unit 1002 is further configured to receive the first RRC reconfiguration complete signaling on the second user instance, where the first RRC reconfiguration complete signaling indicates that the first configuration and the second configuration have been effective on the second user instance or the first configuration and the second configuration have been ineffective on the second user instance.

In some embodiments of this application, the sending unit 1001 is further configured to: when the first RRC reconfiguration signaling indicates the terminal device to make the first configuration effective, before the network device sends the first RRC reconfiguration signaling to the terminal device, send second RRC reconfiguration signaling to the terminal device, where the second RRC reconfiguration signaling carries a second configuration, and the second RRC reconfiguration signaling indicates the terminal device to modify the second configuration and make a modified second configuration effective.

The receiving unit 1002 is configured to receive second RRC reconfiguration complete signaling sent by the terminal device.

In some embodiments of this application, the sending unit 1001 is further configured to: when the first RRC reconfiguration signaling indicates the terminal device to make the first configuration ineffective, after the network device receives the first RRC reconfiguration complete signaling sent by the terminal device, send third RRC reconfiguration signaling to the terminal device, where the third RRC reconfiguration signaling carries a second configuration, and the third RRC reconfiguration signaling indicates the terminal device to modify the second configuration and make a modified second configuration effective.

The receiving unit 1002 is configured to receive third RRC reconfiguration complete signaling sent by the terminal device.

Figure 11:
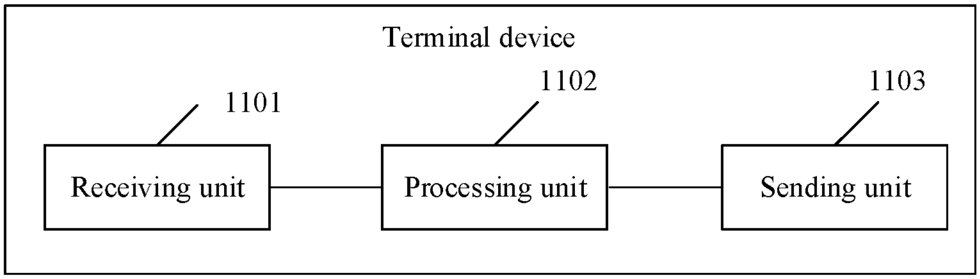
FIG. 11 is a schematic diagram of a structure of a terminal device according to an embodiment of the present disclosure.

The foregoing mainly describes the network device from a perspective of the function modules, and the following describes a terminal device from a perspective of function modules. For example, when the functional units are obtained through division in an integrated manner, FIG. 11 is a schematic diagram of a structure of a terminal device. As shown in FIG. 11, an embodiment of the terminal device in this application may include:

a receiving unit 1101, configured to receive first RRC reconfiguration signaling sent by a network device, where the first RRC reconfiguration signaling carries a first configuration;

a processing unit 1102, configured to make the first configuration effective or makes the first configuration ineffective based on the first RRC reconfiguration signaling; and a sending unit 1103, configured to send first RRC reconfiguration complete signaling to the network device, where the first RRC reconfiguration complete signaling indicates that the first configuration has been effective or the first configuration has been ineffective.

In some embodiments of this application, the first RRC reconfiguration signaling further carries a second configuration and a handover configuration, and the terminal device further includes a handover unit.

The handover unit is configured to hand over a first user instance to a second user instance in a first cell based on the handover configuration.

Correspondingly, the processing unit 1102 is configured to make the first configuration effective or make the first configuration ineffective, and make the second configuration effective or make the second configuration ineffective on the second user instance.

Correspondingly, the sending unit 1103 is configured to send the first RRC reconfiguration complete signaling to the network device on the second user instance, where the first RRC reconfiguration complete signaling indicates that the first configuration and the second configuration have been effective on the second user instance or the first configuration and the second configuration have been ineffective on the second user instance.

In some embodiments of this application, the receiving unit 1101 is further configured to: before the first configuration is made effective based on the first RRC reconfiguration signaling, receive second RRC reconfiguration signaling sent by the network device, where the second RRC reconfiguration signaling carries a second configuration.

The processing unit 1102 is configured to modify the second configuration based on the second RRC reconfiguration signaling, and make a modified second configuration effective.

The sending unit 1103 is configured to send second RRC reconfiguration complete signaling to the network device.

In some embodiments of this application, the receiving unit 1101 is further configured to: after the terminal device sends the first RRC reconfiguration complete signaling to the network device, and when the first RRC reconfiguration complete signaling indicates that the first configuration has been ineffective, receive third RRC reconfiguration signaling sent by the network device, where the third RRC reconfiguration signaling carries a second configuration.

The processing unit 1102 is configured to modify the second configuration based on the third RRC reconfiguration signaling, and make a modified second configuration effective.

The sending unit 1103 is configured to send third RRC reconfiguration complete signaling to the network device.

Figure 12:
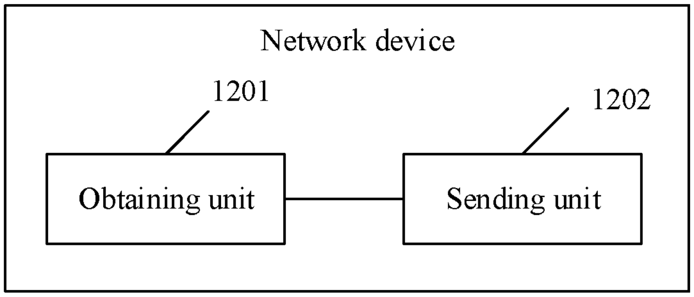
FIG. 12 is a schematic diagram of a structure of another network device according to an embodiment of the present disclosure.

It may be understood that FIG. 12 is a schematic diagram of a structure of another network device. As shown in FIG. 12, an embodiment of the network device in this application may include:

- an obtaining unit 1201, configured to obtain an SR configuration in a TDM configuration ambiguity period; and
- a sending unit 1202, configured to send a first scheduling instruction to a terminal device when the SR configuration changes, where the first scheduling signaling indicates the terminal device to send uplink data.

In some embodiments of this application, the sending unit 1202 is configured to send the first scheduling signaling to the terminal device based on a preset period.

In some embodiments of this application, the network device further includes a detection unit, configured to: before the first scheduling instruction is sent to the terminal device, detect an SR on a first PUCCH, and detecting an SR on a second PUCCH, where the first PUCCH is a channel pointed to before the SR configuration changes, and the second PUCCH is a channel pointed to after the SR configuration changes.

Correspondingly, the sending unit 1202 is configured to send the first scheduling instruction to the terminal device when the SR is detected on the first PUCCH or the SR is detected on the second PUCCH.

Figure 13:
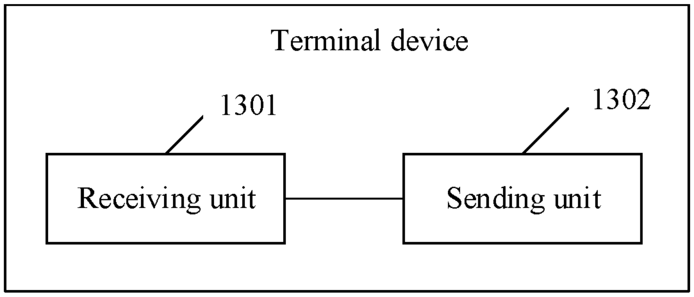
FIG. 13 is a schematic diagram of a structure of another terminal device according to an embodiment of this application.

It may be understood that FIG. 13 is a schematic diagram of a structure of another terminal device. As shown in FIG. 13, an embodiment of the terminal device in this application may include:

- a receiving unit 1301, configured to receive a first scheduling instruction sent by a network device when an SR configuration changes, where the SR configuration is obtained by the network device in a TDM configuration ambiguity period; and
- a sending unit 1302, configured to send uplink data based on the first scheduling instruction.

Figure 14:
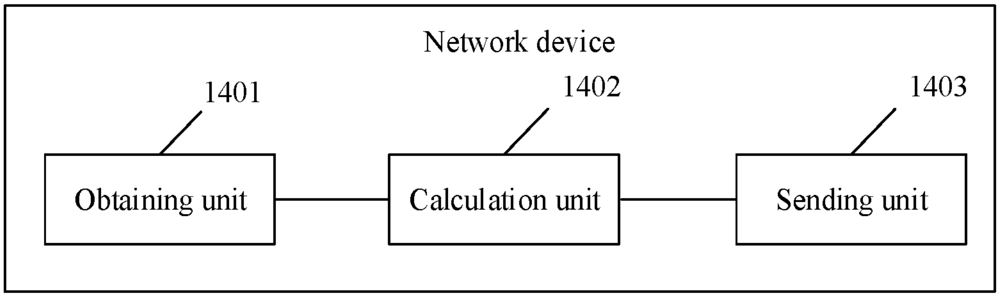
FIG. 14 is a schematic diagram of a structure of another network device according to an embodiment of the present disclosure.

It may be understood that FIG. 14 is a schematic diagram of a structure of another network device. As shown in FIG. 14, an embodiment of the network device in this application may include:

- an obtaining unit 1401, configured to obtain a TDM configuration in a TDM configuration ambiguity period;
- a calculation unit 1402, configured to calculate a first air interface moment and a second air interface moment based on the TDM configuration, where the first air interface moment is a moment at which a terminal device feeds back downlink response signaling in a first scheduling period, the second air interface moment is a moment at which the terminal device sends uplink data in the first scheduling period, and the first air interface moment does not overlap the second air interface moment; and
- a sending unit 1403, configured to receive, at the first air interface moment, the downlink response signaling sent by the terminal device, or receive, at the second air interface moment, the uplink data sent by the terminal device.

It may be understood that another embodiment of the terminal device in this application may include: a sending unit, configured to send downlink response signaling to a network device at a first air interface moment, or send uplink data to the network device at a second air interface moment, where the first air interface moment does not overlap the second air interface moment, the first air interface moment is a moment at which the terminal device feeds back the downlink response signaling in a first scheduling period, and the second air interface moment is a moment at which the terminal device sends the uplink data in the first scheduling period.

Figure 15:
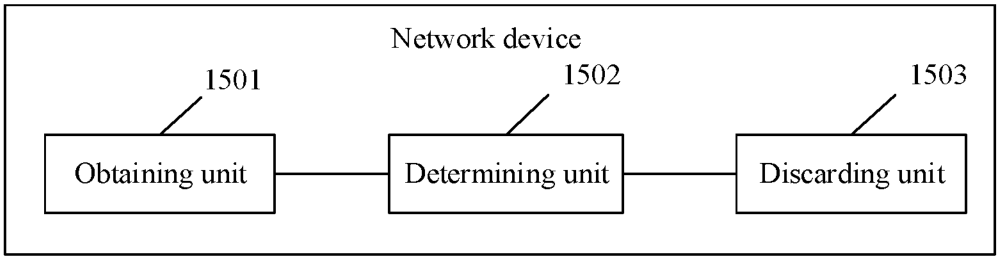
FIG. 15 is a schematic diagram of a structure of another network device according to an embodiment of the present disclosure.

It may be understood that FIG. 15 is a schematic diagram of a structure of another network device. As shown in FIG. 15, an embodiment of the network device in this application may include:

- an obtaining unit 1501, configured to obtain a channel quality indicator CQI configuration or a sounding reference signal SRS configuration in a time division multiplexing TDM configuration ambiguity period;
- a determining unit 1502, configured to determine, when the CQI configuration changes, whether a CQI sent by a terminal device is received, or determine, by the network device when the SRS configuration changes, whether an SRS sent by a terminal device is received, where the SRS is for determining a timing advance TA measurement value; and
- a discarding unit 1503, configured to discard the CQI or the TA measurement value of the SRS if the network device receives the CQI sent by the terminal device and determines the TA measurement value based on the SRS.

The network device and the terminal device provided in embodiments of this application are configured to perform the method in the method embodiment corresponding to any one of FIG. 2 to FIG. 8. For understanding of embodiments of this application, refer to related parts in the method embodiments corresponding to FIG. 2 to FIG. 8.

In embodiments of this application, the network device and the terminal device each are presented in a form of function units obtained through division in an integrated manner. The "function unit" herein may be an application-specific integrated circuit (ASIC), a processor and a memory that execute one or more software or firmware programs, an integrated logic circuit, and/or another component that can provide the foregoing functions. In a simple embodiment, a person skilled in the art may figure out that the network device and the terminal device each may be in a form shown in FIG. 9.

For example, the processor 901 in FIG. 9 may invoke the computer-executable instructions stored in the memory 902, so that the network device and the terminal device perform the method performed by the network device and the terminal device in the method embodiment corresponding to any one of FIG. 2 to FIG. 8.

Functions/implementation processes of the processing unit 1102 in FIG. 11, the detection unit in FIG. 12, the calculation unit 1402 in FIG. 14, and the determining unit 1502 and the discarding unit 1503 in FIG. 15 may be implemented by the processor 901 in FIG. 9 by invoking the computer-executable instructions stored in the memory 902. A function/implementation process of a first receiving unit 801 in FIG. 8 may be implemented by the transceiver 904 in FIG. 9.

Functions/implementation processes of the sending unit 1001 and the receiving unit 1002 in FIG. 10, the receiving unit 1101 and the sending unit 1103 in FIG. 11, the obtaining unit 1201 and the sending unit 1202 in FIG. 12, the receiving unit 1301 and the sending unit 1302 in FIG. 13, the obtaining unit 1401 and the sending unit 1403 in FIG. 14, and the obtaining unit 1501 in FIG. 15 may be implemented by the transceiver 904 in FIG. 9.

In the device in FIG. 9 in this application, a communication connection is implemented between the components. The processing unit (or the processor), the storage unit (or the memory), and the transceiver unit (the transceiver) communicate with each other through an internal connection path, to transfer a control signal and/or a data signal. The foregoing method embodiments of this application may be applied to a processor, or the steps in the foregoing method embodiments are implemented by a processor. The processor may be an integrated circuit chip with a signal processing capability. In an implementation process, the steps in the foregoing method embodiments may be implemented by using an integrated logic circuit of hardware in the processor, or by using instructions in a form of software. The processor may be a central processing unit (CPU), a network processor (NP), a combination of the CPU and the NP, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, steps, and logical block diagrams disclosed in this application. The general-purpose processor may be a microprocessor, or the processor may be any conventional processor or the like. Steps of the methods disclosed with reference to this application may be directly executed and accomplished by using a hardware decoding processor, or may be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods in combination with hardware of the processor. Although only one processor is shown in the figure, the apparatus may include a plurality of processors, or the processor includes a plurality of processing units. The processor may be a single-core (single-CPU) processor, or may be a multi-core (multi-CPU) processor.

The memory is configured to store computer instructions executed by the processor. The memory may be a storage circuit, or may be a memory. The memory may be a volatile memory or a nonvolatile memory, or may include the volatile memory and the nonvolatile memory. The nonvolatile memory may be a read-only memory, a programmable read-only memory, an erasable programmable read-only memory, an electrically erasable programmable read-only memory, or a flash memory. The volatile memory may be a random access memory, and may serve as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content interaction between the processor and another unit or network element. The transceiver may be a communication interface of the apparatus, may be a transceiver circuit or a communication unit, or may be a transceiver. Alternatively, the transceiver may be a communication interface of the processor or a transceiver circuit. Optionally, the transceiver may be a transceiver chip. The transceiver may alternatively include a sending unit and/or a receiving unit. In a possible implementation, the transceiver may include at least one communication interface. In another possible implementation, the transceiver may alternatively be a unit implemented in a form of software. In embodiments of this application, the processor may interact with another unit or network element by using the transceiver. For example, the processor obtains or receives content from the another network element by using the transceiver. If the processor and the transceiver are two physically separated components, the processor may exchange content with the another unit of the apparatus without using the transceiver.

In a possible implementation, the processor, the memory, and the transceiver may be connected to each other through a bus. The bus may be a peripheral component interconnect (PCI) bus, an extended industry standard architecture (EISA) bus, or the like. Buses may be classified into an address bus, a data bus, a control bus, and the like.

In embodiments of this application, words such as "exemplary" or "for example" are for representing giving an example, an illustration, or a description. Any embodiment or design scheme described as "exemplary" or "for example" in embodiments of this application should not be explained as being more preferred or having more advantages than another embodiment or design scheme. Exactly, use of the word such as "exemplary" or "for example" is intended to present a relative concept in a specific manner.

In embodiments of this application, for ease of understanding, a plurality of examples are used for description. However, these examples are merely examples, but do not mean optimal implementations for implementing this application.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like.

The technical solutions provided in this application are described in detail above. The principles and implementations of this application are described by using specific examples in this application. The descriptions about the foregoing embodiments are merely for helping understand the method of this application and a core idea thereof. In addition, a person of ordinary skill in the art can make variations to the specific implementations and application scopes according to the idea of this application. Therefore, the content of this specification shall not be construed as a limitation to this application.

What is claimed is:

1. A message sending method, the method comprising:

sending, by a network device, a first radio resource control (RRC) reconfiguration signal to a terminal device, wherein the first RRC reconfiguration signal carries a first configuration that comprises a time division multiplexing (TDM) configuration, wherein the first RRC reconfiguration signal indicates to the terminal device to make the first configuration effective and indicates that the terminal device enters the TDM configuration under the indication of the network device or make the first configuration ineffective, wherein the first RRC reconfiguration signal further comprises a second configuration and a handover configuration, wherein the handover configuration indicates to the terminal device to hand over a first user instance to a second user instance in a first cell, and wherein the network device covers the first cell;

receiving, by the network device, a first RRC reconfiguration complete signal sent by the terminal device, wherein the first RRC reconfiguration complete signal indicates whether the first configuration has been made effective or the first configuration has been made ineffective, and wherein receiving the first RRC reconfiguration complete signal comprises receiving, by the network device, the first RRC reconfiguration complete signal on the second user instance, wherein the first RRC reconfiguration complete signal indicates whether the first configuration and the second configuration have been made effective on the second user instance or the first configuration and the second configuration have been made ineffective on the second user instance, so that a corresponding configuration on the second user instance is a new configuration and a new time sequence;

obtaining, by the network device, a channel quality indicator (CQI) configuration or a sounding reference signal (SRS) configuration in a TDM configuration ambiguity period;

determining, by the network device, when the CQI configuration changes, whether a CQI sent by the terminal device is received, or the network device determines, when the SRS configuration changes, whether an SRS sent by the terminal device is received, wherein the SRS is for determining a corresponding timing advance (TA) measurement value; and discarding, by the network device, the CQI and the TA measurement value in response to receiving, by the network device, the CQI sent by the terminal device.

2. The method according to claim 1, wherein the first RRC reconfiguration signal indicates to the terminal device to make the first configuration effective, and the method further comprises, before the sending the first RRC reconfiguration signal to the terminal device:

sending, by the network device, a second RRC reconfiguration signal to the terminal device, wherein the second RRC reconfiguration signal carries the second configuration, and wherein the second RRC reconfiguration signal indicates to the terminal device to modify the second configuration and make a modified second configuration effective; and receiving, by the network device, a second RRC reconfiguration complete signal sent by the terminal device.

3. The method according to claim 1, wherein the first RRC reconfiguration signal indicates to the terminal device to make the first configuration ineffective, the method further comprises, after the receiving the first RRC reconfiguration complete signal sent by the terminal device:

sending, by the network device, a second RRC reconfiguration signal to the terminal device, wherein the second RRC reconfiguration signal carries the second configuration, and wherein the second RRC reconfiguration signal indicates to the terminal device to modify the second configuration and make a modified second configuration effective; and receiving, by the network device, a second RRC reconfiguration complete signal sent by the terminal device.

4. The method according to claim 1, wherein the first RRC reconfiguration signal further carries a discontinuous reception (DRX) configuration.

5. A network device, the network device comprising:

at least one processor; and one or more memories comprising computer instructions that, when executed by the at least one processor, cause the network device to perform operations comprising:

sending a first radio resource control (RRC) reconfiguration signal to a terminal device, wherein the first RRC reconfiguration signal carries a first configuration that comprises a time division multiplexing (TDM) configuration, and wherein the first RRC reconfiguration signal indicates to the terminal device to make the first configuration effective and indicates that the terminal device enters the TDM configuration under the indication of the network device or make the first configuration ineffective, wherein the first RRC reconfiguration signal further comprises a second configuration and a handover configuration, wherein the handover configuration indicates to the terminal device to hand over a first user instance to a second user instance in a first cell, and wherein the network device covers the first cell;

receiving a first RRC reconfiguration complete signal sent by the terminal device, wherein the first RRC reconfiguration complete signal indicates whether the first configuration has been made effective or the first configuration has been made ineffective, and wherein receiving the first RRC reconfiguration complete signal comprises receiving, by the network device, the first RRC reconfiguration complete signal on the second user instance, wherein the first RRC reconfiguration complete signal indicates whether the first configuration and the second configuration have been made effective on the second user instance or the first configuration and the second configuration have been made ineffective on the second user instance, so that a corresponding configuration on the second user instance is a new configuration and a new time sequence;

obtaining a channel quality indicator (COI) configuration or a sounding reference signal (SRS) configuration in a TDM configuration ambiguity period;

determining when the COI configuration changes, whether a CQI sent by the terminal device is received, or the network device determines, when the SRS configuration changes, whether an SRS sent by the terminal device is received, wherein the SRS is for determining a corresponding timing advance (TA) measurement value; and discarding the COI and the TA measurement value in response to receiving, by the network device, the CQI sent by the terminal device.

6. The network device according to claim 5, wherein the first RRC reconfiguration signal indicates to the terminal device to make the first configuration effective, and the operations further comprise:

before the sending the first RRC reconfiguration signal to the terminal device, sending a second RRC reconfiguration signal to the terminal device, wherein the second RRC reconfiguration signal carries the second configuration, and the second RRC reconfiguration signal indicates to the terminal device to modify the second configuration and make a modified second configuration effective; and receiving a second RRC reconfiguration complete signal sent by the terminal device.

7. The network device according to claim 5, wherein the first RRC reconfiguration signal indicates to the terminal device to make the first configuration ineffective, and the operations further comprise:

after the receiving the first RRC reconfiguration complete signal, sending a second RRC reconfiguration signal to the terminal device, wherein the second RRC reconfiguration signal carries the second configuration, and wherein the second RRC reconfiguration signal indicates to the terminal device to modify the second configuration and make a modified second configuration effective; and receiving a second RRC reconfiguration complete signal sent by the terminal device.

8. A non-transitory computer-readable storage medium that stores instructions that, when executed on one or more processors, causes the one or more processors to execute steps of a method comprising:

sending, by a network device, a first radio resource control (RRC) reconfiguration signal to a terminal device, wherein the first RRC reconfiguration signal carries a first configuration that includes a time division multiplexing (TDM) configuration, wherein the first RRC reconfiguration signal indicates to the terminal device to make the first configuration effective and indicates that the terminal device enters the TDM configuration under the indication of the network device or make the first configuration ineffective, wherein the first RRC reconfiguration signal further carries a second configuration and a handover configuration, wherein the handover configuration indicates to the terminal device to hand over a first user instance to a second user instance in a first cell, and wherein the network device covers the first cell;

receiving, by the network device, a first RRC reconfiguration complete signal sent by the terminal device, wherein the first RRC reconfiguration complete signal indicates whether the first configuration has been made effective or the first configuration has been made ineffective, and wherein receiving the first RRC reconfiguration complete signal comprises receiving, by the network device, the first RRC reconfiguration complete signal on the second user instance, wherein the first RRC reconfiguration complete signal indicates whether the first configuration and the second configuration have been made effective on the second user instance or the first configuration and the second configuration have been made ineffective on the second user instance, so that a corresponding configuration on the second user instance is a new configuration and a new time sequence;

obtaining, by the network device, a channel quality indicator (CQI) configuration or a sounding reference signal (SRS) configuration in a TDM configuration ambiguity period;

determining, by the network device, when the COI configuration changes, whether a CQI sent by the terminal device is received, or the network device determines, when the SRS configuration changes, whether an SRS sent by the terminal device is received, wherein the SRS is for determining a corresponding timing advance (TA) measurement value; and discarding, by the network device, the COI and the TA measurement value in response to receiving, by the network device, the CQI sent by the terminal device.

9. The non-transitory computer-readable storage medium of claim 8, wherein the first RRC reconfiguration signal indicates to the terminal device to make the first configuration effective, and the method further comprises, before the sending the first RRC reconfiguration signal to the terminal device:

sending, by the network device, a second RRC reconfiguration signal to the terminal device, wherein the second RRC reconfiguration signal carries the second configuration, and wherein the second RRC reconfiguration signal indicates to the terminal device to modify the second configuration and make a modified second configuration effective; and receiving, by the network device, a second RRC reconfiguration complete signal sent by the terminal device.

10. The non-transitory computer-readable storage medium of claim 8, wherein the first RRC reconfiguration signal indicates to the terminal device to make the first configuration ineffective, the method further comprises, after the receiving the first RRC reconfiguration complete signal sent by the terminal device:

sending, by the network device, a second RRC reconfiguration signal to the terminal device, wherein the second RRC reconfiguration signal carries the second configuration, and wherein the second RRC reconfiguration signal indicates to the terminal device to modify the second configuration and make a modified second configuration effective; and receiving, by the network device, a second RRC reconfiguration complete signal sent by the terminal device.

* * * * *